Feb. 14, 1961   J. R. BRADFORD ET AL   2,971,461
METHOD AND MEANS FOR MEASURING INK FILM THICKNESS
Filed April 22, 1955   4 Sheets-Sheet 1
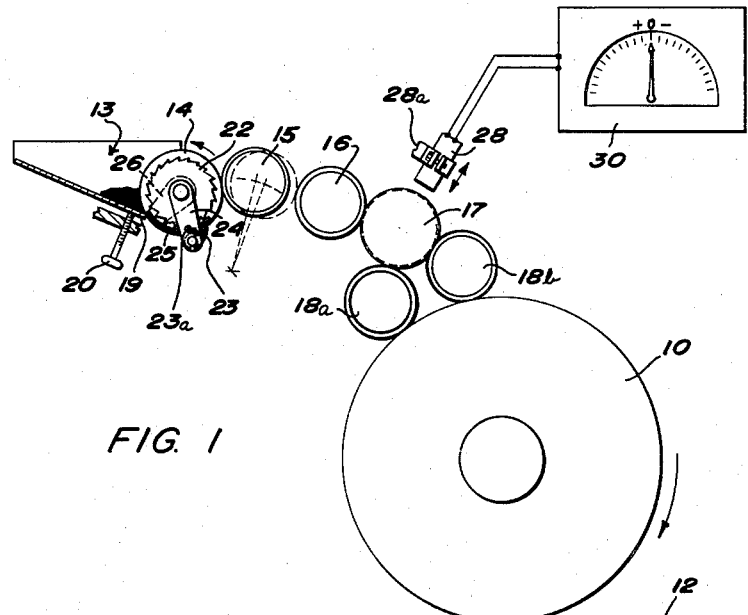
FIG. 1
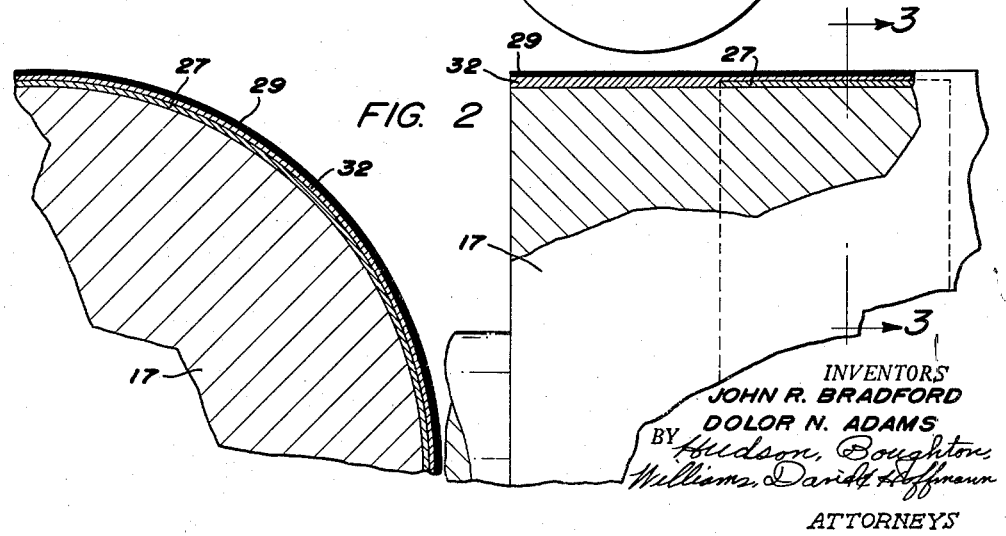
FIG. 3
FIG. 2
INVENTORS
JOHN R. BRADFORD
DOLOR N. ADAMS
BY Hudson, Boughton,
Williams, David Hoffmann
ATTORNEYS Feb. 14, 1961 J. R. BRADFORD ET AL 2,971,461
METHOD AND MEANS FOR MEASURING INK FILM THICKNESS
Filed April 22, 1955 4 Sheets-Sheet 2
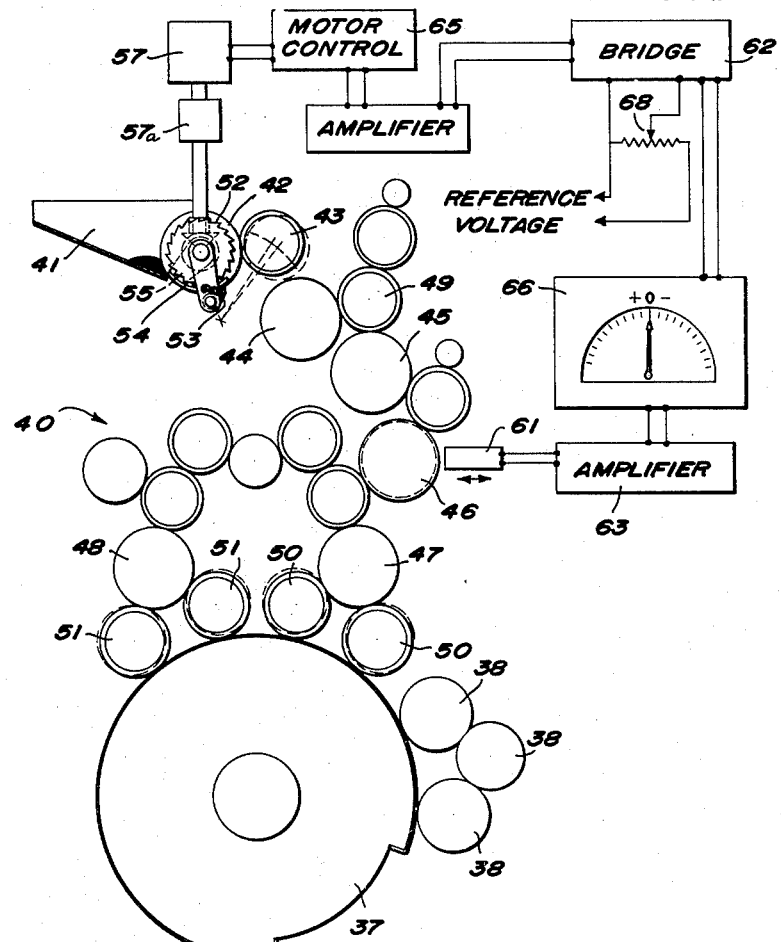
FIG. 4
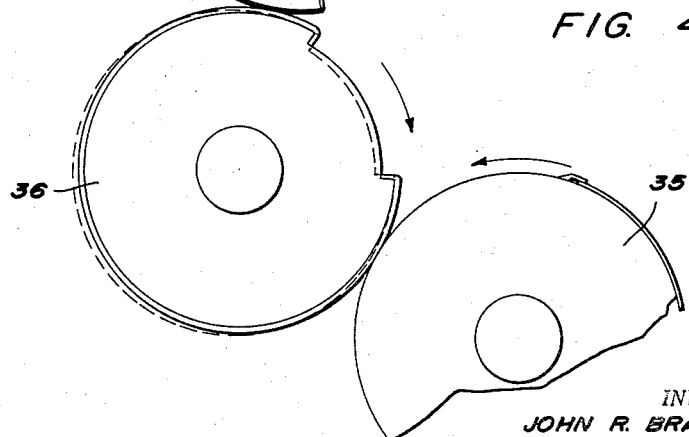
INVENTORS
JOHN R. BRADFORD
DOLOR N. ADAMS
BY Hudson, Boughton,
Williams, David Hoffmann
ATTORNEYS Feb. 14, 1961     J. R. BRADFORD ET AL     2,971,461
METHOD AND MEANS FOR MEASURING INK FILM THICKNESS
Filed April 22, 1955     4 Sheets-Sheet 4

INVENTORS
JOHN R. BRADFORD
DOLOR N. ADAMS
BY Hudson, Boughton,
Williams, David & Hoffmann
ATTORNEYS United States Patent Office 2,971,461
Patented Feb. 14, 1961

2,971,461

METHOD AND MEANS FOR MEASURING INK FILM THICKNESS

John R. Bradford, Morristown, N.J., and Dolor N. Adams, Independence, Ohio, assignors to Harris-Intertype Corporation, a corporation of Delaware Filed Apr. 22, 1955, Ser. No. 503,317

23 Claims. (Cl. 101—426)

The present invention relates to machines, especially printing presses, having a roll or rolls for applying to a base surface a fluid or paste material, such as ink, and to a method of and apparatus for measuring and controlling the thickness of a coating on a roll of the machine or like member, especially on a rotating roll, and to means for controlling the supply of material to the roll in accordance with the thickness of the coating thereon.

The principal object of the present invention is to provide a new and improved printing press in which the thickness and changes in the thickness of ink on a roll thereof can be immediately determined without stopping the operation of the press, whereby imprints of uniform tonal quality may be obtained without reducing the output of the press.

Another object of the present invention is to provide a new and improved printing press or like machine for applying a material to a base surface in which radiation from radioactive material or other radiation emitting device is utilized to determine the thickness of ink or other material on a roll of the machine.

Another object of the present invention is to provide a new and improved printing press in which the supply of ink to the plate or printing roll is automatically controlled to produce imprints of uniform tonal qualities.

Another object of the present invention is to provide a new and improved printing press or similar machine in which the thickness of the ink film or other coating on a roll thereof is constantly monitored and the supply of ink or other material to the roll is either automatically adjusted in accordance with the thickness of the ink or other material thereon, or is adapted to be adjusted manually to maintain an ink film or other coating at a predetermined thickness.

Another object of the present invention is to provide a new and improved printing press or like machine for applying ink or other material to a base surface wherein the film of ink or other coating material on a roll thereof is irradiated with a radioactive radiation and in which radiation responsive means is utilized to measure the amount of radiation transmitted by the film on the roll and effect control of adjustable means for controlling the supply of ink or other material to the machine.

Another object of the present invention is to provide a new and improved printing press in which the plate cylinder is inked by an inker comprising a plurality of ink distributing rolls, including form rolls engageable with the plate cylinder for applying ink thereto and a ducting roll, and in which a roll intermediate the form rolls and the supply of ink for the press is provided with radiation emitting means adapted to cooperate with radiation responsive means to obtain a measure the thickness of the ink film thereon, the thickness of the ink film on the roll carrying the radiation emitting means being substantially unaffected by disengagement of the form rolls from the plate cylinder.

Another object of the present invention is to provide a new and improved printing press or like machine in which a cylinder or roll is inked or coated by means comprising a supply roll such as a fountain roll, the rotation of which determines the supply of ink or other coating material and in which means is provided to control the rotation of the supply or fountain roll in accordance with the thickness of the ink film or other coating on one of the rolls of the machine, the thickness of the ink film or coating on the particular roll preferably being measured by means adapted to irradiate the ink film or other coating and measure the amount of radiation transmitted by the film or coating to determine the thickness thereof.

Another object of the present invention is to provide a new and improved printing press or similar material applying machine in which a weak beta radiator is applied to a roll thereof to obtain a measure of the thickness of the ink film or other coating thereon, the beta radiator having a half life greater than the expected life of the roll, and in which radiation responsive means is provided to indicate the amount of radiation transmitted by the ink film or other coating on the roll.

Another object of the present invention is to provide a new and improved method of determining the thickness of, or changes in the thickness of, a coating or film on a roll, especially a rotating roll of a machine such as a printing press, in which radiation emitting means, preferably radioactive material, is provided to irradiate the coating or film to be measured with a radiation transmitted by the film or coating in proportions dependent upon the thickness of the film or coating and in which the radiation transmitted by the film is measured to obtain an indication of the thickness thereof.

Another object of the present invention is to provide a new and improved method of controlling the supply of ink to a printing press wherein the thickness of the ink film on a roll of the press is constantly monitored or measured and the supply of the ink adjusted in accordance with the thickness of the film to maintain the film at a predetermined thickness.

Further objects and advantages of the present invention will be apparent from the following detailed description of embodiments of the present invention described with reference to the accompanying drawing forming a part of this specification and in which:

Fig. 1 is an elevational view, chiefly diagrammatic, of a printing press embodying the present invention;

Fig. 2 is a fragmentary enlarged view with portions cut away of a roller of the press shown in Fig. 1;

Fig. 3 is a sectional view taken approximately along line 3—3 of Fig. 2;

Fig. 4 is an elevational view, chiefly diagrammatic, of an offset printing press embodying the present invention and in which the supply of ink is automatically controlled;

Figure 5:
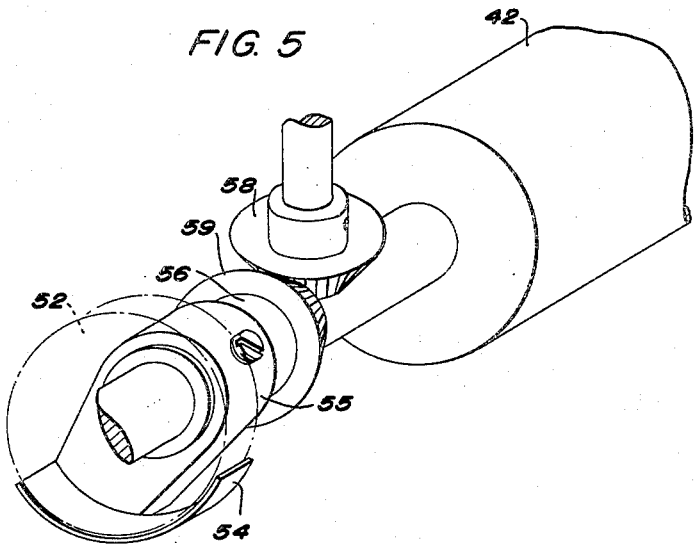
Fig. 5 is a detached fragmentary perspective view of the fountain roll of Fig. 4 and the means for controlling the rotation thereof.

Referring to the drawings, a press of the letterpress type embodying the preferred form of the present invention is illustrated in Fig. 1 and generally comprises a plate cylinder 10 adapted to cooperate with an impression cylinder 11 to make an imprint on a web or sheet 12, fed between the cylinders 10 and 11. Ink for the plate cylinder 10 is supplied thereto from an ink well or fountain 13 by a plurality of ink distributing and supplying rolls comprising a fountain roll 14, a ducting roll 15, an intermediate roll 16, a vibrating storage drum or roll 17, and a pair of form rolls 18a, 18b. The ducting roll 15 is adapted to be moved between positions in engagement with the intermediate roll 16 and the fountain roll 14 respectively to transfer ink from the fountain roll to the intermediate roll. The intermediate roll 16 is in engagement with the vibrating storage drum or roll 17 which, in turn, engages the form rolls 18a, 18b. The roll 17 is adapted to be reciprocated or vibrated lengthwise in a manner well known to those skilled in the art and is continuously rotated by the drive means for the press. Rolls 16, 18a and 18b are friction driven by being in contact with roll 17 and with plate cylinder 10. The ducting roll 15 is freely rotatable and rotates with the roll with which it is in engagement. The press as thus far described is of conventional construction and has, therefore, not been described or shown in detail.

The amount of ink picked up by the fountain roll 14 from the fountain 13 is determined by the spacing between the roll and the edge of a blade 19 which extends the length of the fountain roll. Micrometer adjusting screws 20, only one of which appears in the drawing, bear against the underside of blade 19 and may be adjusted to determine the spacing between the blade and the fountain roll, and consequently the thickness of the film of ink applied to the fountain roll 14. The amount of ink transferred from the fountain roll 14 to the ducting roll 15 may be controlled by varying the number of degrees of rotation of the fountain roll while it is in engagement with the ducting roll. The fountain roll is adapted to be rotated when in engagement with the ducting roll by drive means comprising a ratchet wheel 22 fixed to the shaft of the fountain roll and engaged by a pawl 23 mounted on an arm 24 journaled on the shaft of the fountain roll. The arm 24 is reciprocated in timed relation to the movement of the ducting roll by any suitable means operated by the drive mechanism of the press. The pawl 23 is biased toward the wheel 22 by a spring 23a connected between the pawl and the arm 24. The number of degrees the fountain roll is rotated for each stroke of the pawl 23 is controllable, in the preferred embodiment, by means of an arcuate member or mask 25 adapted to be positioned intermediate the pawl 23 and the ratchet wheel 22. The mask 25 is supported for movement about the ratchet wheel by an arm 26 rotatably supported on the shaft of the fountain roll. The mask 25 may be moved either to the right or to the left by any suitable means to determine the point in the stroke of the pawl 23 that the latter is permitted to engage a tooth on the ratchet wheel 22. It is considered within the scope of this invention to provide other means such as a toothless clutch to provide for control of ink supplied by the ink fountain.

According to one feature of the present invention, the thickness of the ink film or coating on the vibrating storage roll 17 is constantly monitored so that it may be maintained at a predetermined thickness. In the preferred embodiment, an ink is used in the press which has an opacity to a particular type of radiation, preferably radiation from radioactive material, and the thickness of the ink film on the roll 17 is measured by irradiating the film with radiation to which the ink film has opacity and measuring the amount of radiation transmitted by the film. The amount of radiation transmitted by the film will be inversely dependent upon the thickness of the film, thereby providing a means for obtaining a measure of the film thickness. As stated above, the radiation emitting device is preferably one which emits radioactive radiation and in the illustrated embodiment, comprises a band 27 of radioactive material plated on the roll 17. The roll 17 is a vibrating roll, in the present case, and the width of the band 27 is preferably greater than the amplitude of vibration of the roll.

It has been found that nickel having an atomic weight of 63 is especially suitable for use as a radiator, particularly with the heavier printing inks, for example, with inks having a specific gravity of about 1.8. Nickel 63 emits a weak beta ray radiation and may be plated onto the roll by mixing the radioactive nickel with a conventional nickel plating solution. The half life of the radioactive nickel is longer than the expected life of the roll 17, making it unnecessary under normal conditions to replace the radioactive material during the life of the roll 17.

A radiation detector 28, which may be a Geiger-Mueller tube, as in the illustrated embodiment, when a radioactive material is used, is supported adjacent to the roll 17 in a position to receive and measure radiation transmitted by an ink film 29 on the roll 17, in this case, beta rays from the $Ni^{63}$. The radiation detecting means is preferably supported for movement toward and away from the roll 17, and in the illustrated embodiment is shown as being supported by a clamp member 28a encircling the Geiger-Mueller tube. A suitable indicating instrument 30, which is calibrated so as to enable the pressman to determine when the thickness of the ink film on the roll is below or above that desired, is connected to the output terminals of the radiation detector 28.

The roll 17 including the band of radioactive material 27 is preferably covered by a sleeve or sheath 32 of ink receptive material. The sleeve 32 may be a pleating of copper applied after the application of band 27 and of such a thickness that it does not absorb sufficient radiation from the radioactive material to prevent the necessary radiation from reaching the ink film thereon. The amount of radiation to which the ink film is subjected may, of course, be controlled by varying the thickness of the copper. The sleeve 32 also prevents the radioactive material from wearing off the roll 17 while the press is in operation thereby assuring a constant source of radiation during the life of the roll 17 and further provides that the entire surface of the roll is equally receptive to ink.

By way of example, the roll 17 may be provided with a suitable coating of radioactive nickel by plating the radioactive nickel from a conventional plating solution onto the roll 17 until the plating is thick enough to give 50,000 counts per minute on a Geiger-Mueller tube positioned approximately 3" from the radioactive material. After the plating of radioactive nickel has been applied, copper may then be plated over the steel roll and the band of radioactive nickel. The depth of the copper plating may, by way of example, be approximately .0006". It has been found that a copper overlay of this thickness will absorb approximately one-half of the radiation from the radioactive nickel regardless of the strength of the radiation.

The present invention also contemplates the provision of means for automatically controlling the operation of the inker of a printing press in accordance with the film thickness on one of the rolls thereof. Fig. 4 shows a printing couple and inker of a lithographic press which has automatic means for controlling the supply of ink from the ink fountain.

Referring to Fig. 4, the press comprises an impression cylinder 35, a blanket cylinder 36, and a plate cylinder 37. The material to be printed is fed between the impression cylinder 35 and the blanket cylinder 36. The plate cylinder which carries the lithographic plate is dampened by suitable dampening rolls 38 which receive a dampening solution from suitable foundation means, not shown, and inked by an inker 40. The inker 40 is of the type shown and described in Harrold et al. Patent No. 2,448,975, and will not, therefore, be described in detail with the exception of that part of the inker necessary for a complete understanding of the present invention.

With respect to the general construction of the inker 40, suffice it to say that the inker comprises an ink fountain 41 having a fountain roll 42, a ducting roll 43, vibrating drums or rolls 44, 45, 46, 47 and 48 and one or more rolls 49, preferably composition rolls, intermediate each of the adjacent vibrating drums or rolls and adapted to transfer ink between the adjacent rolls. The drums 47, 48 are storage drums and engage form rolls 50, 51, respectively, in engagement with the plate cylinder. The vibrating rolls are preferably comprised of steel and vibrated in the direction of their axes by suitable mechanism described in detail in the above-mentioned patent.

The press and inker 40 are preferably of the type wherein, when the supply of material being imprinted is interrupted, the operation of the ducting roll is stopped, the form rolls 50, 51 are moved out of engagement with the plate cylinder 37, and the plate cylinder and the blanket cylinder 36 are separated.

The amount of ink transferred from the fountain roll to the ducting roll is, in the embodiment of Fig. 4, adapted to be controlled in the same manner as the first-described embodiment. The shaft of the fountain roll 42 is provided with a ratchet wheel 52 adapted to be engaged by a pawl 53 supported from the shaft of the fountain roll in a manner similar to the pawl of the first-described embodiment. The pawl 53 is reciprocated in timed relation to the movement of the ducting roll by suitable means operated from the drive mechanism for the press. The number of degrees of rotation of the fountain roll for each stroke of the pawl 53 is determined by an arcuate member or mask 54 positioned intermediate the pawl 53 and the ratchet wheel 52 and adapted to operate in the same manner as the mask 25 of the embodiment of Fig. 1 to control the rotation of the fountain roll. The mask 54 is supported for rotation about the ratchet wheel by an arm 55 fixed to a bushing 56 freely rotatable on the shaft of the fountain roll 42. The mask 54 is adapted to be moved about the ratchet wheel 52 by a reversible motor 57 for rotating the bushing 56. The shaft of the motor 57 carries a bevel gear 58 which is continuously in mesh with a bevel gear 59 secured to one end of the bushing 56. By operating the motor 57 the position of the mask 54 with respect to the pawl 53 may be varied to control the number of degrees of rotation of the fountain roll 42 for each stroke of the pawl 53. Gear reduction mechanism 57a is provided intermediate the motor 57 and bevel gear 58.

The rotation of the motor 57 to properly position the mask 54 is controlled in accordance with the thickness of the ink film on one of the rolls of the inker 40, preferably a roll approximately midway between the plate cylinder 37 and the fountain roll 42. While printing, the inker will have a heavy charge of ink nearest the fountain, with the thickness of the ink film on the various rolls gradually decreasing closer to the plate cylinder. In non-printing conditions, the ink tends to equilibrate on the rolls of the inker. It has been found that a roll or rolls approximately midway between the fountain and plate generally has the same ink film thickness in both printing and non-printing conditions. By selecting one of these rolls as the one to have the radioactive band, changes in the setting of the mask 54 are less likely to occur when changing from printing to non-printing conditions or vice versa.

In the illustrated embodiment the roll 46, which is approximately midway between the plate cylinder 37 and the fountain roll 42, is provided with radiation emitting means adapted to subject the ink film thereon to a radiation transmitted by the film in amounts inversely dependent upon the thickness thereof. As in the first-described embodiment, the radiation emitting means is preferably a band of radioactive material adapted to emit weak beta rays and may be comprised essentially of $Ni^{63}$. The amount of radiation transmitted by the film is adapted to be measured by a Geiger-Mueller counter or tube 61 and the operation of the motor 57 controlled in accordance with the radiation transmitted by the coating. The output of the Geiger-Mueller tube used to control the motor 57 may be connected to a bridge circuit 62 through an amplifier 63 and the output of the bridge circuit 62 then amplified and used to actuate a suitable motor control circuit 65. The bridge circuit 62 may be balanced so that when the thickness is as desired, the output of the bridge is zero; and if the thickness then changes in one direction, the output of the bridge will be of one polarity and if the thickness changes in the other direction, the output of the bridge will be of a different polarity to control the operation of the reversible motor 57. A meter 66 may be provided intermediate the amplifier and the bridge circuit as illustrated, to enable the pressman to check the operation of the device and facilitate the proper adjustment thereof.

The ideal thickness of the ink film on the roll 46 will depend upon the type of surface which is being imprinted and the tonal qualities of the imprint desired. The control means for the ink supply may be initially adjusted by making test runs until the press is producing an imprint having the desired tonal qualities and by then adjusting the position of the Geiger-Mueller tube with respect to the roll 46 so that the output of the bridge circuit 62 and the indication of the meter 66 is zero. If the press is to be set up in this manner the Geiger-Mueller tube is supported by suitable means which permits the tube to be moved toward and away from the roll 46.

The thickness of the ink film on the roller 46 can be adjusted electrically by providing suitable means, such as a voltage divider, in the reference voltage supply for the bridge circuit. In Fig. 4 the reference voltage supply for the bridge has been indicated as connected to the bridge through a voltage divider 68. It will be understood by those skilled in the art that by changing the reference voltage applied to the bridge, the output of the Geiger-Mueller tube needed to produce balance of the bridge will be varied, thereby providing a means which is quickly settable and which may be calibrated directly into units of ink thickness to determine the thickness of the ink on the film of roll 46 that will be maintained by the control means.

Figure 6:
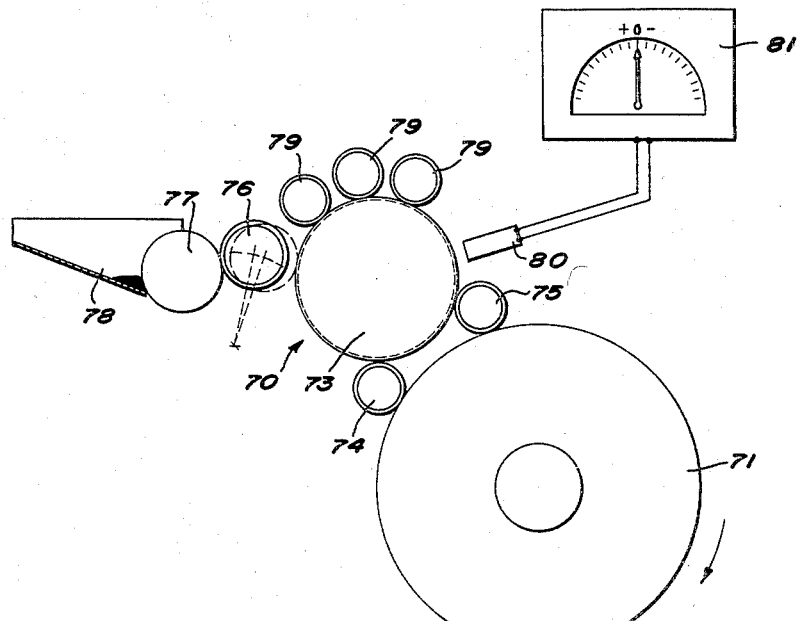
Fig. 6 is an elevational view, chiefly diagrammatic, of another form of printing press embodying the present invention.

Fig. 6 illustrates the present invention embodied in a printing press having an inker 70 adapted to apply ink to a plate cylinder 71 which cooperates with an impression cylinder 72 to imprint a material passed therebetween. The inker 70 comprises a storage roll or drum 73 which is in engagement with form rolls 74, 75 adapted to apply ink to the plate on the plate cylinder 71. Ink is supplied to the storage drum 73 by a ducting roll 76 which is moved between a first position in engagement with the storage drum 73 and a second position in engagement with a fountain roll 77 of an ink fountain 78. The structure of the ink fountain and fountain roll, while not shown in detail in Fig. 6, may be the same as that of the above-described embodiments. The ink on the storage drum is adapted to be broken up and distributed by a plurality of vibrating rollers 79 in engagement with the drum and adapted to be reciprocated or vibrated longitudinally of their axes. In this type of press the storage drum 73 is not vibrated as in the presses of Figs. 1 and 4.

The storage drum 73 is preferably provided with a band of radioactive material, such as $Ni^{63}$, which is adapted to emit a radiation which passes through the ink film on the drum and is measured by a Geiger-Mueller tube or counter 80 connected to an indicating meter 81. The band of radioactive material in this case for optimum results need not be as wide as in the case where the storage drum 73 is reciprocated longitudinally of its length. The operation of the inker is adapted to be controlled in accordance with the radiation transmitted by the ink film on the storage drum 73, the radiation transmitted being indicative of the thickness of the ink film.

Figure 7:
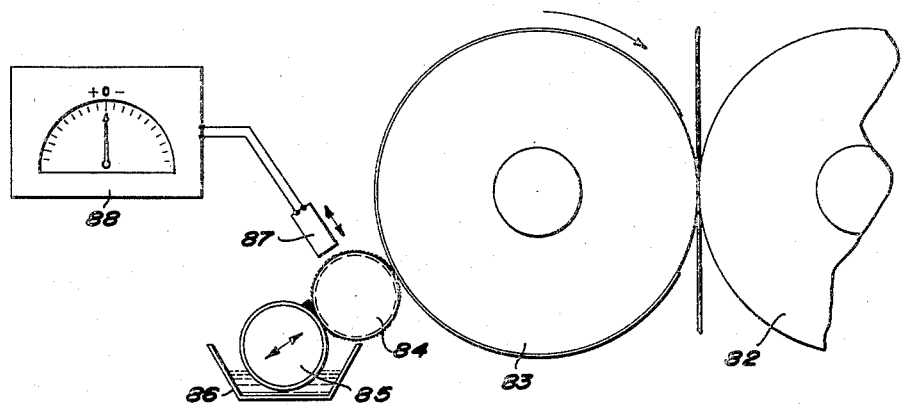
Fig. 7 is an elevational view, chiefly diagrammatic, of a printing press of the type generally referred to as an aniline printing press embodying the present invention.

In Fig. 7 the present invention is shown as embodied in the type of printing press generally referred to as an aniline printing press, which comprises an impression cylinder 82, a plate cylinder 83 having a rubber plate mounted thereon, an engraved roll 84 in engagement with the rubber plate and a fountain roll 85 of an ink fountain or well 86. The fountain roll 85 is a composition roll which is immersed in the inkwell 86 and is continuously in engagement with the engraved roll 84. The rolls are rotated to transfer ink from the fountain to the plate cylinder 83 and the amount of ink transferred may be controlled by varying the pressure between the rolls 84, 85 in a manner well known to those skilled in the art. According to the present invention, the roll 84 is provided with a radiation emitting device, preferably a weak beta radiator as in the above-described embodiments, adapted to subject the ink film thereon to the radiation therefrom. The amount of radiation transmitted by the film is measured by a Geiger-Mueller tube 87 which is connected to an indicating meter 88. The position of the Geiger-Mueller tube 87 is initially adjusted so that the meter 88 indicates zero when the roll 84 has a film of proper thickness thereon. As the thickness of the film varies, it will be indicated on the meter and proper adjustment may be made by the pressman or suitable means similar to those used to position the mask 54 in Fig. 4 may be provided for automatically varying the pressure between the rolls 84, 85 in accordance with the ink film on the roll 84.

Although the radioactive material has been shown and described as being a band around a roll, a spot of material can be used. Under certain circumstances, fluctuations in obtained readings may result and compensation may be necessary to prevent such fluctuations from affecting control of the ink supply.

While the present invention provides a new and improved printing press inking mechanism, it will be well understood by those skilled in the art that other machines utilizing rolls for applying material to a base surface may be advantageously controlled in the manner described above and that the present invention also provides a new and improved method and means for measuring the thickness of a film on a roll, particularly a rotating roll, wherever it may be desirable to obtain such a measurement.

While pawl and ratchet mechanism is the form of ink fountain control shown, it is to be understood that any form of control presently known may be utilized. For example, the ducting roll may be controlled to dwell in contact with the fountain roll for a specified period which may be varied; or, the fountain roll may be mounted in eccentrics which may be adjusted to determine the amount of ink the fountain roll picks up. Still other adjustments may be made without departing from the spirit and scope of the invention. Also, in the illustrated embodiment, the radioactive material has been described as plated onto steel rolls of the press, the radioactive material, or other radiation device, may however be carried by a composition or rubber roll if so desired.

It will be apparent from the foregoing that the enumerated objects, as well as others apparent from the foregoing description, have been accomplished and that a new and improved printing press, as well as a method and apparatus for measuring thickness of ink film on rotating rolls has been provided, and that further modifications, constructions and arrangements will be apparent to those skilled in the art and it is hereby our intention to cover all such constructions, modifications and arrangements which fall within the scope and spirit of the present invention.

Having thus described our invention, we claim:

1. The method of controlling the amount of ink applied to a printing cylinder of a printing press comprising, applying a coating of radioactive material to a roll of the printing press normally having an ink film thereon which is indicative of the thickness of the ink film on the printing cylinder, supplying ink to said roll to form an ink film thereon, determining the thickness of the ink film on said roll by measuring the amount of radiation transmitted by the film of ink on the roll, and controlling the supply of ink to said roll in accordance with the amount of the radiation transmitted by the ink film to control the thickness of the ink film on said roll.

2. The method of controlling the amount of ink applied to the plate cylinder of a printing press wherein ink is applied to the plate cylinder by means comprising a plurality of ink distributing rolls, which method comprises selecting an ink distributing roll on which the ink coating on the roll remains substantially uniform even though the inking rolls normally in engagement with the plate cylinder are moved from engagement therewith and the supply of ink to the ink distributing rolls interrupted, passing a radiation through the coating on the selected roll from one side of the coating, measuring the radiation transmitted by said coating, and controlling the supply of ink in accordance with the radiation transmitted by the coating.

3. The method of controlling the thickness of ink on a plate cylinder of a printing press wherein ink is applied to the plate cylinder by a plurality of ink distributing rolls including form rolls adapted to roll against the cylinder, selecting a roll intermediate the supply of ink for the press and the form rolls on which the thickness of the ink film does not change substantially if the form rolls are moved out of engagement with the plate cylinder and the supply of ink to the ink distributing rolls interrupted, applying a coating of radioactive material to the roll so that radiation will pass outwardly through the ink coating thereon, measuring the radiation transmitted by the coating, and controlling the supply of ink to the ink distributing rolls in accordance with the radiation transmitted by the coating.

4. In a printing press, an ink distributing roll, means for rotating said roll, adjustable means for supplying ink to said roll, radiation emitting means carried by said roll for emitting radiation adapted to pass through the coating of ink thereon, radiation responsive means for measuring radiation transmitted by said coating of ink, and means for supporting the radiation responsive means in position to receive radiation transmitted by said coating.

5. In a material applying machine, a material distributing roll, means for rotating said roll, adjustable means for supplying material to said roll, radioactive means carried by said roll for emitting radiation adapted to pass through the coating of material thereon in proportions dependent on the thickness of the coating, radiation responsive means for measuring radiation, and means for supporting the radiation responsive means in position to receive radiation transmitted by said coating.

6. In a printing press, a plate cylinder, means for inking said plate cylinder comprising a plurality of inking rolls including a roll carrying radioactive material adapted to emit a radiation which will be transmitted by the ink coating on the roll in proportions dependent upon the thickness of the ink coating, radiation responsive means for measuring radiation transmitted by the ink coating, and means supporting said radiation responsive means adjacent to said roll carrying said radioactive material.

7. In a printing press, a plate cylinder, means for inking said plate cylinder comprising a plurality of inking rolls including a roll carrying radiation emitting means adapted to emit a radiation which will be transmitted by the ink coating on the roll in proportions dependent upon the thickness of the ink coating, a sleeve of ink receptive metallic material covering said radioactive material and the roll supporting the radioactive material, radiation responsive means for measuring radiation transmitted by the ink coating, and means supporting said radiation responsive means adjacent to said roll carrying said radiation emitting means.

8. In a printing press, a plate cylinder, a plurality of rolls for inking said cylinder including a metal roll having radioactive $Ni^{63}$ plated thereon, adjustable means for supplying ink to said rolls, radiation responsive means, and means supporting said radiation responsive means adjacent to said roll having $Ni^{63}$ thereon for measuring radiation from the Ni$^{63}$ transmitted by the ink coating on the roll.

9. In a printing press, an ink distributing roll, adjustable means for supplying ink to said roll, radioactive material carried by said roll and adapted to emit a radiation which passes through the ink coating thereon, and radiation responsive means for measuring the radiation transmitted by said coating and controlling said adjustable means for supplying ink to said roll in accordance with the thickness of the coating thereon to maintain a uniform coating.

10. In a material applying machine, a rotating material distributing roll, adjustable means for supplying material to said roll, a radioactive substance carried by said roll and adapted to emit a radiation which passes through the material coating thereon in amount dependent on the thickness of the coating, and radiation responsive means for measuring the radiation transmitted by said coating and controlling said adjustable means for supplying ink to said roll in accordance with the thickness of the coating thereon to maintain a uniform coating.

11. In a printing press, a plate cylinder, means for applying ink to said plate cylinder comprising a plurality of ink distributing rolls, an ink fountain including a fountain roll, a ducting roll for transferring ink from said fountain to said ink distributing rolls, means for moving said ducting roll back and forth between a position in engagement with said fountain roll and a second position in engagement with one of said ink distributing rolls, means for rotating the said fountain roll when in engagement with said ducting roll including adjustable means for determining the angular rotation of said fountain roll during the time it is in engagement with said ducting roll to determine the amount of ink transferred from said fountain roll to said ducting roll, and control means operatively connected to said adjustable means comprising means for measuring the thickness of ink coating on one of said rolls of said means for applying ink and for varying said adjustable means to maintain a uniform ink coating on the roll.

12. In a printing press, a plate cylinder, means for applying ink to said plate cylinder comprising a plurality of ink distributing rolls, an ink fountain including a fountain roll, a ducting roll for transferring ink from said fountain to said ink distributing rolls and movable back and forth between a position in engagement with said fountain roll and a second position in engagement with one of said ink distributing rolls, means for rotating said fountain roll when in engagement with said ducting roll including adjustable means for determining the angular rotation of said fountain roll during the time it is in engagement with said ducting roll to determine the amount of ink transferred from said fountain roll to said ducting roll, control means operatively connected to said adjustable means for varying said adjustable means, said control means comprising radiation emitting means subjecting the ink film on one of said rolls of the first-mentioned means to radiation, and means for measuring radiation transmitted by said film.

13. In a printing press, a plate cylinder, means for applying ink to said plate cylinder comprising a plurality of ink distributing rolls including a roll having radioactive material thereon for irradiating the ink coating on the roll, an ink fountain including a fountain roll, a ducting roll for transferring ink from said fountain roll to one of said ink distributing rolls, means for moving said ducung roll back and forth between a position in engagement with said fountain roll and a second position in engagement with said one ink distributing roll, means for rotating the said fountain roll when in engagement with said ducting roll including adjustable means for determining the angular rotation of said fountain roll during the time it is in engagement with said ducting roll to determine the amount of ink transferred from said fountain roll to said ducting roll, and control means operatively connected to said adjustable means comprising radiation responsive means for measuring radiation from said material transmitted by said ink coating, and means interconnecting said radiation responsive means and said adjustable means for varying said adjustable means to maintain a uniform ink coating on the roll having said radioactive material thereon.

14. In a printing press, a plate cylinder, means for applying ink to said plate cylinder comprising a plurality of ink distributing rolls including a roll carrying a beta ray emitting material for subjecting the ink coating thereon to beta ray radiation, said material having a half-life approximately at least as long as the expected life of its supporting rolls, an ink fountain including a fountain roll, a ducting roll for transferring ink from said fountain to said ink distributing rolls, means for moving said ducting roll back and forth between a position in engagement with said fountain roll and a second position in engagement with one of said ink distributing rolls, means for rotating the said fountain roll when in engagement with said ducting roll including adjustable means for determining the angular rotation of said fountain roll during the time it is in engagement with said ducting roll to determine the amount of ink transferred from said fountain roll to said ducting roll, control means operatively connected to said adjustable means comprising beta ray responsive means for measuring the radiation transmitted by said ink coating, and means for interconnecting said beta ray responsive means and said adjustable means for varying the latter to maintain a uniform ink coating on the roll carrying said beta ray emitting material.

15. In a printing press, a plate cylinder, an ink fountain including a rotatable fountain roll, a plurality of rolls for transferring ink from said fountain to said plate cylinder including a ducting roll adapted to periodically engage said fountain roll, means for rotating said fountain roll while in engagement with said ducting roll comprising driven means opertaively connected to said fountain roll for rotating the roll, driving means for driving said driven means, adjustable means for determining the angularity through which said fountain roll is rotated for the period said ducting roll is in contact with said fountain roll, and means for measuring the thickness of the ink film on one of said plurality of rolls, said measuring means being operatively connected to said adjustable means to control the supply of ink to said one roll to maintain a predetermined ink film thickness.

16. In a printing press, a plate cylinder, an ink fountain including a rotatable fountain roll, a plurality of rolls for transferring ink from said fountain to said plate cylinder including a ducting roll adapted to engage said fountain roll, means for rotating said fountain roll while in engagement with said ducting roll comprising a ratchet wheel operatively connected to said fountain roll for rotating the fountain roll, a reciprocable pawl angularly movable about said ratchet wheel and engageable therewith to rotate the wheel, and a mask adjustable about said wheel poistioned intermediate said pawl and said wheel for determining the point on said wheel engaged by said pawl, and means for measuring the thickness of the ink film on one of said plurality of rolls and for positioning said mask about said ratchet wheel to control the supply of ink to said one roll to maintain a predetermined ink film thickness comprising power means for moving said mask, radiation emitting means carried by said one roll and adapted to irradiate the ink film on said one roll, radiation responsive means, means supporting said radiation responsive means adjacent to said one roll to measure radiation transmitted by the ink film thereon, and means interconnecting said radiation responsive means and said power means for operating the latter in accordance with the radiation transmitted by said ink film.

17. In a machine including a rotatable roll for distributing coating material, means for rotating said roll, means for supplying said material to said roll to form a coating thereon, means for adjustably controlling the quantity of material supplied by said supplying means, radiation emitting means carried by said roll for emitting radiation adapted to pass through the coating of material thereon, radiation responsive means for measuring the radiation transmitted by said coating, and means for supporting the radiation responsive means in position to receive the radiation transmitted by said coating.

18. The method of controlling the amount of liquid coating material being applied to a base member as it passes through a machine which includes cylinder means for applying the coating material to the base member comprising at least one roll normally having a coating thereon of said material the thickness of which is indicative of the thickness of the coating applied to said base member, supplying the material to said roll to provide a coating of said material thereon, determining the thickness of the coating on said roll by subjecting the coating thereon to radiation to establish a radiation field which varies in accordance with the thickness of said coating, measuring said radiation field to ascertain the thickness of said coating and controlling the supply of the coating material to said roll in accordance with the radiation field to control the thickness of the coating applied to said base member.

19. The method according to claim 18 wherein said radiation is from radioactive material.

20. The method of controlling the amount of liquid coating material being applied to a rotating cylinder of a machine which cylinder accepts the coating material as a coating having discontinuities therein and applies the material to a base member as a coating on the base member with discontinuities in the coating, the machine including means comprising at least one roll normally having a coating thereon of said material the thickness of which is indicative of the thickness of the coating on said cylinder for applying the coating material to the cylinder, the steps which include supplying the coating material to said roll to provide a coating of said material thereon, determining the thickness of the coating on said roll by subjecting the coating thereon to a radiation to establish a radiation field which varies in accordance with the thickness of said coating, measuring said radiation field to ascertain the thickness of said coating, and controlling the supply of coating material to said roll in accordance with the radiation field to control the thickness of the coating material applied to said base member.

21. The method according to claim 20 wherein said radiation is from radioactive material.

22. The method of controlling the amount of ink applied to a rotary plate cylinder of a printing press wherein the ink is applied to the plate cylinder by means comprising a plurality of rotating ink-distributing rolls, the steps which comprise selecting an ink-distributing roll on which the ink coating on the roll remains substantially uniform even though the inking rolls normally in engagement with the plate cylinder are moved from engagement therewith and the supply of ink to the ink-distributing rolls interrupted, measuring the thickness of the ink coating on the selected roll while the rolls are rotated by subjecting the ink coating on the selected roll to radiation to establish a radiation field which varies in accordance with the thickness of the ink coating on the selected roll and controlling the supply of ink to the selected roll in accordance with the radiation field to maintain the thickness of the coating on the roll substantially constant.

23. The method according to claim 22 wherein said radiation is from radioactive material.

References Cited in the file of this patent

UNITED STATES PATENTS

| 1,210,559 | Story | Jan. 2, 1917 |
| 2,477,776 | Talbot | Aug. 2, 1949 |
| 2,488,269 | Clapp | Nov. 15, 1949 |
| 2,501,174 | Hertzog | Mar. 21, 1950 |
| 2,690,120 | Burroughs | Sept. 28, 1954 |

OTHER REFERENCES

Textile World, December 1948, vol. 98, No. 12, pages 103 to 106.

Radioisotopes in Industry, 1953, Reinhold Publishing Corp., pages 80 to 82 and 290 to 292 and page 256.